Feb. 17, 1931. A. O. FORSTER ET AL 1,792,734

TRAP NEST

Filed June 15, 1927 3 Sheets-Sheet 1

INVENTOR.
Albert O. Forster and
Percy M. Forster
BY
Townsend, Loftus & Ablett
ATTORNEYS.

Feb. 17, 1931.  A. O. FORSTER ET AL  1,792,734
TRAP NEST
Filed June 15, 1927   3 Sheets-Sheet 2
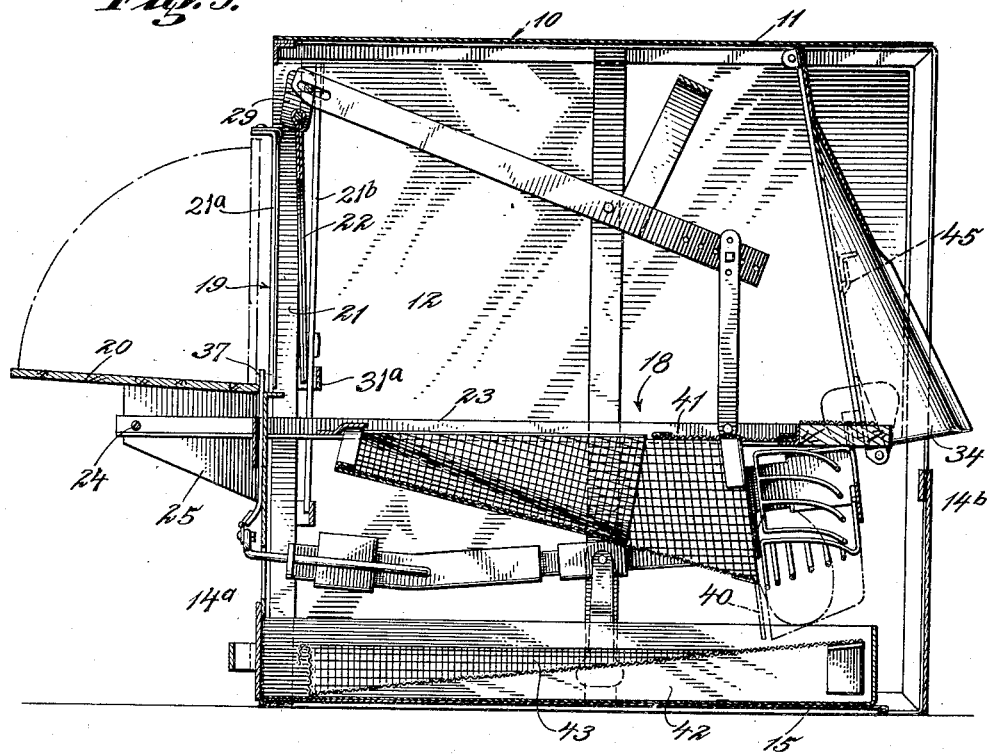
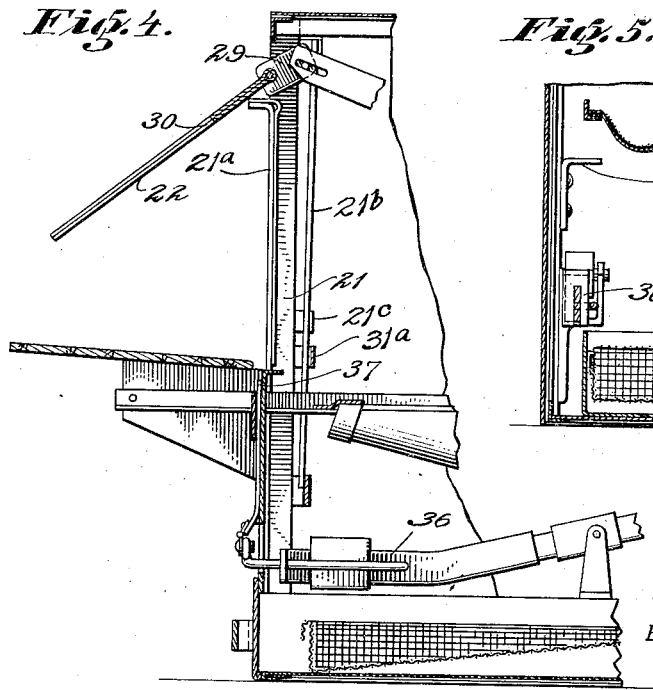
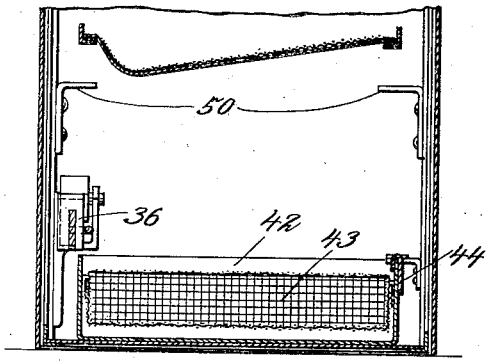
INVENTOR.
Albert O. Forster and
Percy M. Forster
BY
ATTORNEYS.

Feb. 17, 1931.    A. O. FORSTER ET AL    1,792,734
TRAP NEST
Filed June 15, 1927    3 Sheets-Sheet 3

INVENTOR.
Albert O. Forster and
Percy M. Forster.
BY
Townsend Loftus & Affett
ATTORNEYS.

Patented Feb. 17, 1931

1,792,734

UNITED STATES PATENT OFFICE

ALBERT O. FORSTER AND PERCY M. FORSTER, OF BERKELEY, CALIFORNIA, ASSIGNORS OF ONE-FOURTH TO THOMAS I. FORSTER, AND ONE-FOURTH TO TONY L. KELLY, BOTH OF BERKELEY, CALIFORNIA

TRAP NEST

Application filed June 15, 1927. Serial No. 198,939.

This invention relates to a trap nest and particularly pertains to certain improvements in trap nests of the general character shown in our Patents No. 1,467,149 and No. 1,751,141 issued September 4, 1923, and March 18, 1930, respectively.

It is the principal object of the present invention to generally improve and simplify the construction and operation of trap nests of the character referred to whereby to provide a trap nest which will be automatically operated by the presence of a hen and the presence of an egg to segregate the laying and non-laying hens and direct them into different poultry yards so that an accurate account may be kept upon the productivity of the hens, and rendering it possible to cull out the non-productive hens.

In carrying out this object into practice we provide a nest structure positioned intermediate two poultry yards. This nest structure is provided with door controlled openings communicating with each yard and embodies automatically operating mechanism directing the laying hens into one poultry yard from the other and retaining the non-laying hens in the original poultry yard.

One form which the invention may assume is exemplified in the following description and illustrated by way of example in the accompanying drawings, in which:

Fig. 3 is a view in central vertical section through the nest structure showing the operating parts in the position they assume when the hen is on the nest and has laid an egg.

Fig. 4 is a fragmentary view in central vertical section through the entry end of the nest showing the mechanism which prevents the entry door from closing when swung to an outward position.

Fig. 5 is a fragmentary view in transverse vertical section through the nest structure showing the means for limiting the downward movement of the nest structure and the mounting of the latching bar.

Figure 1:
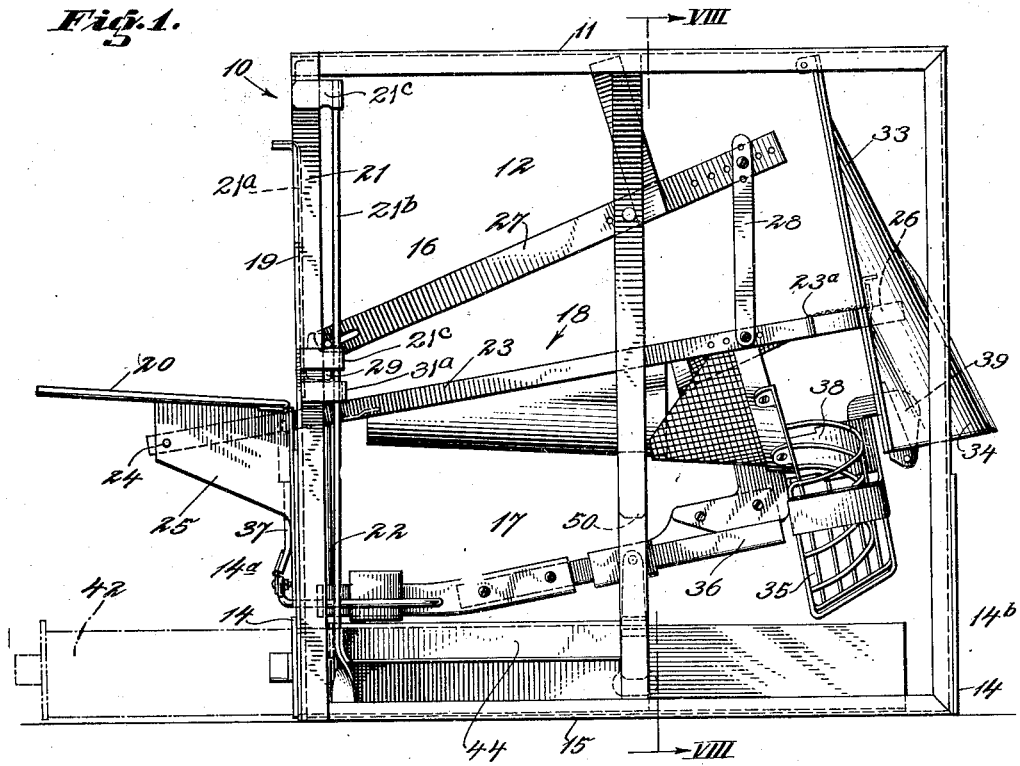
Fig. 1 is a view in side elevation of a trap nest embodying the preferred form of our invention with the side wall thereof removed to disclose the construction and arrangement of the operating parts of the mechanism.

Referring more particularly to the accompanying drawings 10 indicates a substantially rectangular housing here disclosed as formed with a top 11, side walls 12, end walls 14 and a bottom 15. In the present instance the housing is shown as formed with an upper compartment 16 and a lower compartment 17. These compartments are separated by an oscillatory nest structure 18 which will be hereinafter more particularly described.

At one end or that designated by the numeral 14$^a$, hereinafter termed the entry end, the end wall 14 is formed with an entry opening 19. This entry opening communicates with the upper compartment 16 and is of sufficient dimensions to permit a hen to readily pass into the housing above the nest structure 18. An entry platform 20 is disposed horizontally at the bottom of the entry opening 19 and is pivotally connected or hinged to the housing at its inner end so that it may be swung up parallel to and in close proximity to the end 14 of the housing, when desired.

At opposite sides of the housing at the entry end 14$^a$ we form guideways 21 by the provision of fixed vertical members 21$^a$ and 21$^b$ to receive a vertically reciprocable entry door 22. The members 21$^a$ are held in place by clips 21$^c$. This entry door 22 is normally disposed in a lowered or unobstructing position with its upper edge on the level with the horizontally disposed entry platform 20. The entry door 22 is adapted to be automatically operated by the weight of a hen disposed on the nest structure 18.

To accomplish this the nest structure includes a pair of longitudinally disposed side frames 23 which are pivotally connected at their ends to the housing as at 24. This pivotal point 24 as shown in the drawings is somewhat beyond the entry end 14ª of the housing and the connection is accomplished by providing brackets 25 secured to the housing and projecting outwardly a sufficient distance to receive the pivotal connections 24. The side frames 23 of the nest structure extend longitudinally and substantially horizontally within the housing at the sides thereof and at the exit end 14ᵇ of the housing they are connected together by a transverse nest frame 23ª, which also supports a platform 26 which is disposed on the same plane with the side frames 23 and projects toward the exit end 14ᵇ of the housing.

The nest structure disclosed in the present application is more particularly described and claimed in our Patent No. 1,751,141.

For purposes of more clearly understanding the present invention, however, it will be stated that the nest structure is carried by the frame members 23 and 23ª and is substantially scoop shaped. That is to say, it has considerable more depth at the exit end 14ᵇ of the housing than it has at the entry end 14ª of the housing. It will suffice to say that the nest structure is so designed as to be substantially sanitary and permanent, it being formed with a removable section which may be expeditiously removed and cleaned.

For the purposes of producing a cooperative action between the nest structure 18 and the entry door 22, we provide a pair of centrally pivoted arms 27 which are arranged one at each side of the housing above the nest structure 18. These door actuating arms 27 are pivoted to the sides of the housing intermediate their ends and are pivotally connected at one end to the top of the entry door 22 at the opposite sides thereof. At their other ends they are connected by links 28 to the side frames 23 of the nest structure 18. By means of this connecting structure between the nest 18 and the entry door 22, oscillating movement of the nest structure 18 will be translated into vertical reciprocation of the entry door 22.

Thus, it will be seen that when the nest is disposed in the position shown in Fig. 1 with the entry door 22 in a lowered or open position, the weight of a hen entering the nest will cause the nest 18 to swing downwardly about its pivotal points 24 and through the links 28 cause the arms 27 to elevate the entry door 22 to a position obstructing the entry opening 19.

At opposite sides of the entry door at the top thereof it is fitted with a pair of guide shoes 29, one located within each guideway 21. These guide shoes or lugs 29 are relatively fixed to the top so that they may pivot in unison with respect to the arms 27. At the top of each guideway 21 the front wall of the guideway is cut-away so that under certain conditions when the entry door 22 is in its uppermost position, its lower end may swing outwardly about its point of pivotal connection with the arms 27. When swung outwardly, the guide shoes or lugs 29 are moved out of register with the guideways 21 and engage the top end of the front guideway members 21ª and prevent lowering movement of the entry door 22 until the latter is returned to a vertical position with the guide lugs 29 in register with the guideways 21. This is quite important because it prevents the door from lowering when not in proper position. Should the door 22 commence to lower while the door is swung outwardly, its lower end will engage the platform 20 and render the entire structure inoperative. Likewise, it prevents the door from lowering when a hen is leaving the nest through the entry door 22, which sometimes occurs during the operation of the next.

To permit the hen to open the door, it is formed with an arched slot or opening 30 so that a hen may thrust her head through the opening and her weight against the door to swing the same outwardly and permit her to exit from the nest. Were it not for the provision of the lugs 29 and their engagement with the front guideway members 21ª when the door 22 is swung outwardly, the moment the hen stepped from the nest structure to the platform 20 the door 22 would commence to lower and entrap the hen between it and the platform 20.

The particular lever arrangement which connects the door to the nest sufficiently counterweights the nest so that the latter will normally return to its uppermost position as shown in Fig. 1 with the door in a lowered position unobstructing the entry opening.

From the foregoing it is obvious that a hen may step from the platform 20 into the nest structure 18 through the entry opening 19 and that her weight will be sufficient to lower the nest to the position shown in Fig. 3. This lowering of the nest structure through the medium of the links 28 and the arms 27 will elevate the entry door 22 to a position obstructing the entry opening 19. The hen will not be disturbed while in the nest due to the provision of a stationary transverse locking bar 31ª disposed substantially on the plane with the lower edge of the entry opening 19 and in a position where it will be engaged by the lower end of the entry door 22 to prevent the latter from being swung inwardly by a hen on the platform 20.

Figure 2:
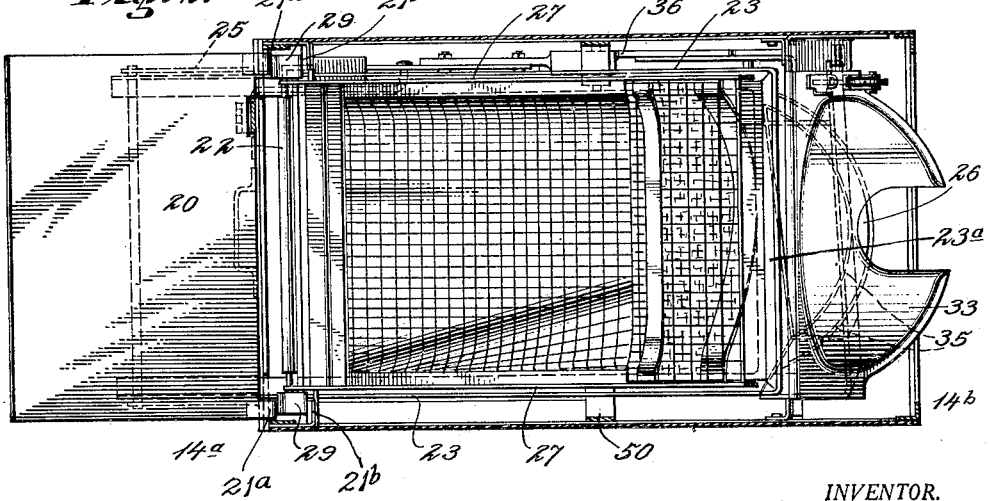
Fig. 2 is a longitudinal plan section through the nest.
Figure 6:
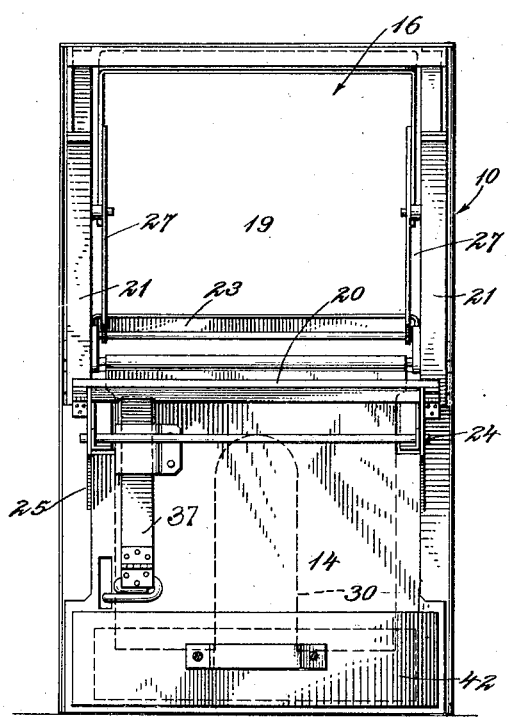
Figs. 6 and 7 are views in elevation of the entry end of the nest housing with the entry door in lowered position in Fig. 6, and in elevated position in Fig. 7.
Figure 8:
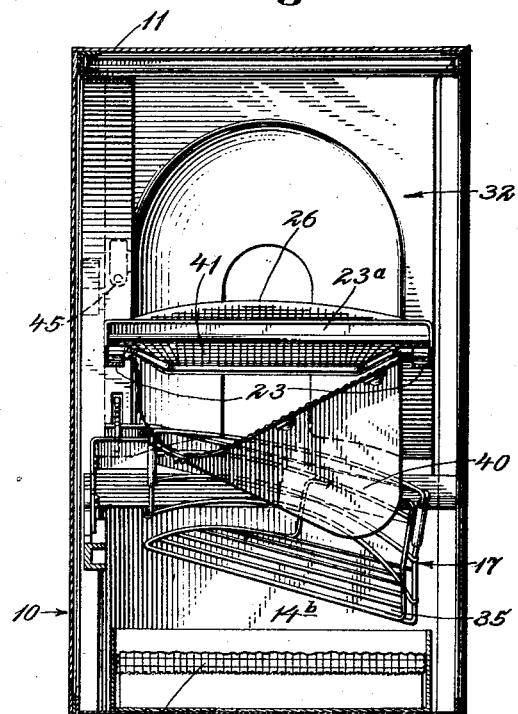
Fig. 8 is a view in vertical transverse section through the structure taken on line VIII—VIII of Fig. 1.
Figure 7:
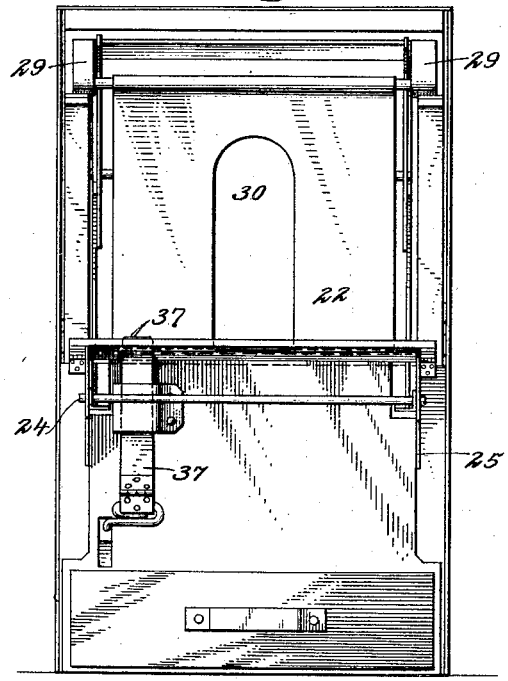
Figure 9:
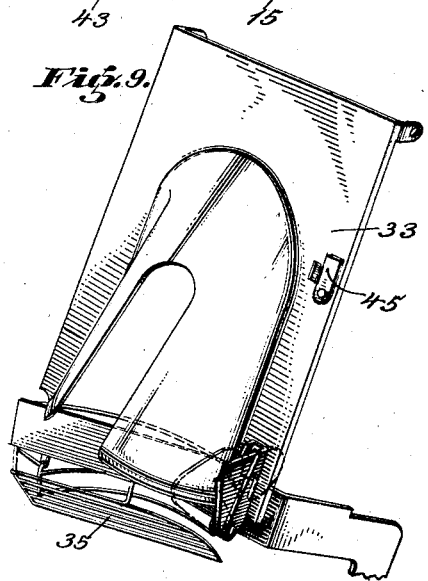
Fig. 9 is a perspective view of the latch operating mechanism.

As previously stated by means of the present trap nest structure, it is intended to segregate laying hens from non-laying hens. To assist in this, the exit end 14ᵇ of the housing is formed with an exit opening 32 which is controlled by an exit door 33. As shown in Figs. 1 and 2 this door is pivotally suspended from the top of the housing to swing in a vertical plane. As shown in these figures, the door is made of a sheet metal piece, the main body of which is shaped to form a canopy substantially the same in shape as a half cone divided along its vertical axis. This canopy thus flares out at the bottom and at the center thereof, and beginning at its bottom edge is an opening 34. This opening is of sufficient dimensions to permit a hen to thrust her head out through the opening and exert pressure against the side walls of the canopy so that when the door is unlatched she may stand on the platform 26 and swing the exit door 33 outwardly. In this position the curved portion of the canopy will fit over the hen's back and permit her to step from the platform 26 outwardly through the exit opening and regain her freedom.

The exit door, however, is normally latched and is unlatched automatically when a hen lays an egg in the nest, so that she may gain her freedom through the exit door. This latching mechanism in fact alternately locks and unlocks the entry and exit doors 22 and 33. This mechanism includes what we prefer to term an egg scale or trough 35 carried by a longitudinally disposed latching lever 36. The egg scale or trough 35 is of a resilient construction so that it will not injure an egg deposited therein. This latching lever 36 is pivoted intermediate its ends to one side of the housing. Contiguous to one end the egg scale or trough 35 projects outwardly transversely therefrom in a position contiguous to the end of the nest at the exit end 14$^b$ of the housing.

At the extremity of the latching lever 36 at the entry end 14$^a$ of the housing it is fitted with an upwardly extending keeper 37 which is disposed in a position exteriorly of the entry door 22 at the lower end thereof when the same is in raised position. The weight of the latching lever 36 and the egg scale 35 is so distributed on the lever 36 that the egg scale 35 will normally assume an elevated position while the end of the lever at the entry end of the housing will assume a lowered position with its keeper 37 in a position unobstructing the opening of the entry door 22. However, when the hen in the nest lays an egg, the weight of the egg overcomes the balance of the lever, moving the keeper 37 upwardly to a position latching the entry door 22 closed. This position is shown in Fig. 3.

At the other end of the latching lever 36 or that end disposed at the exit end of the housing the lever is fitted with an upwardly extending keeper 38 which cooperates with a pivotal latch member 39 on the exit door 33.

The relative positions of the keepers 37 and 38 is such that when the keeper 37 is in an unlatching position, the keeper 38 is in a position latching the exit door closed, but when the keeper 37 is in a position latching the entry door 22 closed, the keeper 38 is in a position permitting the exit door 33 to be opened. Thus, when an egg is laid by the hen in the nest the egg scale 35 lowers, raising the keeper 37, latching the entry door 22 closed and moving the keeper 38 to a position unlatching the exit door 33. Thus, the hen may make her exit from the housing through the exit door 33. If the hen in the nest does not lay an egg, she may exit from the housing through the door 22 as the latching mechanism will not be operated and the door 22 will be the only means of escape.

In the event that the hen lays an egg, the latch mechanism is held in a position latching the entry door closed and unlatching the exit door until the weight of the hen is removed from the nest. This is accomplished by relatively positioning the open end of the nest and the egg scale so that the same will register when the nest is in lowered position, so that the gently sloping bottom of the nest will slope toward the scale. The egg will roll from the nest into the scale. The egg is held in the scale by a shield 40 depending from the bottom of the nest and obstructing the open end of the scale when the nest is in lowered position as shown in Fig. 3. When the hen leaves the nest, and the latter is relieved of the hen's weight, it automatically rises due to the disposition of its weight relative to its pivotal points and the shield 40 is removed from an obstructing position relative to the scale. The egg may then pass from the scale.

Immediately the egg passes from the scale the latter will rise due to the disposition of the weight of the latching lever 36 relative to its pivotal point, placing the latching mechanism in operation unlatching the entry door 22 and latching the exit door. The pivotal latching member on the exit door permits the latter to close after the keeper 38 is in latching position, but does not permit the exit door 33 to open after the exit door has assumed a closed position.

To prevent the hen from stepping on the egg or obstructing its travel from the nest to the scale, an upper shield 41 is provided which is arranged transverse of the nest just above its deeper end. The space between this upper shield and the bottom of the nest is open a sufficient amount to permit the egg to discharge from the nest into the scale.

To receive the eggs from the scale, we provide a drawer 42 which is inserted through an opening in the entry end of the housing. This drawer has a gently sloping false bottom 43 of reticulated material so that the egg discharging from the scale will slowly roll along the false bottom 43 of the drawer toward the entry end 14$^a$ of the housing. To guide the drawer, a pair of guide members 44 are provided at opposite sides of the housing between the entry end and the center of the housing. These guide members 44 engage the upper edges of the sides of the drawer and prevent the latter from tilting when in open position.

In some instances it is desired to trap a hen laying an egg within the nest so that the egg may be marked and identified with the hen laying it. For this purpose, we provide a manually operated latch mechanism 45 which may be actuated to latch the exit door 33 closed. Thus, should the hen in the nest lay an egg, the latch mechanism operated by the latch lever 36 will be placed in operation but will be ineffective relative to the exit door 33. That is to say, the entry door will be latched against opening by the keeper 37 actuated by the egg scale 35, and the exit door 33 will be latched against opening by means of the latch mechanism 45. Thus, the egg may be marked to identify it with the hen in the nest and thereafter the latch 45 opened to permit the hen to regain her freedom.

In operation of the device, the nest is constructed substantially as shown in the drawings and the entry platform 20 is swung to a horizontal position as shown in Fig. 1. The remainder of the mechanism will assume its normal position as shown in Fig. 1 ready to receive a hen.

It should be stated here that the exit and entry doors communicate with different poultry yards so that the hens laying eggs will pass from one poultry yard to another, while the non-laying hens will return to the original poultry yard.

The hen entering the nest will step from the platform 20 into the nest structure 18 and her weight will automatically cause the nest to lower to the position shown in Fig. 3. The lowering movement of the nest will be limited by engagement of the nest frame with a pair of lugs 50 arranged at opposite sides of the housing as illustrated in Fig. 5. This lowering movement of the nest structure 18 will be transmitted to the entry door 22 and the latter will be swung to an elevated position obstructing the entry opening 19. In this position, the entry door will be free to swing outwardly due to its pivotal suspension so that in the event that the hen does not lay an egg she may return to the poultry yard through the entry opening 19 by swinging the entry door 22 outwardly.

When the entry door 22 is swung outwardly and the hen steps to the platform 20 relieving the nest of her weight, the entry door will be held from lowering by engagement of the guide shoes or lugs 29 with the front wall of the guideways 21. Thus, the nest structure cannot rise until the hen steps from the platform 20 and the entry door 22 swings to a vertical position disengaging the lugs 29 from the top front edges of the guideways 21. Immediately, however, the entry door assumes this position the nest structure will swing upwardly about its pivotal points 24 and the entry door 22 will lower to a position unobstructing the entry opening 19. Thus, the nest will be ready to receive another hen.

In the event that the hen entering the nest lays an egg, the egg will roll gently from the nest into the egg scale 35 causing the latter to lower. This lowering of the egg scale will be accompanied by operation of the latching mechanism which will latch the entry door 22 closed and unlatching the exit door 33. Thus, the hen may step from the nest through the exit door and enter the poultry yard provided for the laying hens.

The moment that the nest structure 18 is relieved of the weight of the hen, it will rise tending to assume normal position and remove the shield 40 from an obstructing position in front of the egg scale 35. The egg will then deposit on the reticulated false floor 43 of the drawer and may be removed from the nest by opening the drawer.

When the scale is relieved of the weight of the egg, the latching mechanism will return to normal position, automatically moving the keeper 37 to an unlatching position and moving the keeper 38 to a latching position, latching the exit door 33 closed.

In the event that it is desired to identify the egg with the hen laying it, the latch mechanism 45 is rendered effective to latch the exit door 33 closed. The egg in the egg scale will retain the latter in its lowered position latching the entry door 22 against opening. Thus, the hen will be trapped in the nest and can only be released by unlatching the latch mechanism 45.

From the foregoing it is obvious that we have provided a trap nest structure whereby laying and non-laying hens may be segregated by a mechanism entirely automatic in operation. This mechanism is characterized by its simplicity and the unlikelihood of its becoming out of order.

While we have shown the preferred form of our invention, it is to be understood that various changes may be made in its construction by those skilled in the art without departing from the spirit of the invention, as defined in the appended claims.

Having thus described our invention, what we claim and desire to secure by Letters Patent is:

1. A trap nest comprising a housing having an entry opening and an exit opening, a vertically movable door for the entry opening normally disposed in lowered position unobstructing the entry opening, a door for the exit opening normally disposed in closed position, said entry door being capable of swinging movement when in closed position to permit a hen in the housing to exit from the housing, latch means normally latching said exit door closed and ineffective with respect to the entry door, an oscillatory nest structure, connecting means between the nest structure and the entry door whereby they will operate in unison so that the door will be moved to closed position when the weight of a hen is imposed on the nest, egg receiving means onto which an egg may be delivered from the nest, said egg receiving means being relatively associated with the latching means whereby to render the latch means effective with respect to the entry door and ineffective with respect to the exit door when an egg is deposited thereon.

2. A trap nest comprising a housing having an entry opening and an exit opening, a vertically movable door controlling the entry opening and normally disposed in a lowered or open position, a door for the exit opening normally disposed in closed position, latch means normally ineffective with respect to the entry door and effective with respect to the exit door, an oscillatory nest structure within the housing intermediate the doors, operative connecting means between the nest structure and the entry door whereby the door will normally balance the nest and hold the nest in its uppermost position with the door in its lowermost or open position, said nest being adapted to be moved to its lowermost position with the door in its closed or raised position when the weight of a hen is imposed on the nest, said door being capable of swinging movement when in its raised position whereby a hen in the nest may normally open the door and exit from the nest, an egg receiving means adapted to receive eggs from the nest, said egg receiving means being operatively associated with the latching means whereby to prevent the entry door from swinging open when an egg is deposited in said egg receiving means and simultaneously render the latching means ineffective with respect to the exit door.

3. A trap nest comprising a housing having an entry opening and an exit opening, a vertically reciprocable door controlling the entry opening and normally disposed in a lowered or open position, a door for the exit opening normally disposed in closed position, latch means normally ineffective with respect to the entry door and effective with respect to the exit door, an oscillatory nest structure within the housing intermediate the doors, operative connecting means between the nest structure and the entry door whereby the door will normally balance the nest and hold the nest in its uppermost position with the door in its lowermost or open position, said nest being adapted to be moved to its lowermost position with the door in its closed or raised position when the weight of a hen is imposed on the nest, said door being capable of swinging movement when in its raised position whereby a hen in the nest may normally swing the door outwardly and exit from the nest, means for preventing the entry door from lowering when swung to a position other than its normal position, an egg receiving means of a resilient character adapted to receive eggs from the nest, said egg receiving means being operatively associated with the latching means whereby to prevent the entry door from swinging open when an egg is deposited in said egg receiving means and simultaneously render the latching means ineffective with respect to the exit door.

4. A trap nest comprising a housing having an entry opening and an exit opening, a vertically reciprocable door controlling the entry opening and normally disposed in a lowered or open position, a door for the exit opening normally disposed in closed position, latch means normally ineffective with respect to the entry door and effective with respect to the exit door, an oscillatory nest structure within the housing intermediate the doors, operative connecting means between the nest structure and the entry door whereby the door will normally balance the nest and hold the nest in its uppermost position with the door in its lowermost or open position, said nest being adapted to be moved to its lowermost position with the door in its closed or raised position when the weight of a hen is imposed on the nest, said door being capable of swinging movement when in its raised position whereby a hen in the nest may normally swing the door outwardly and exit from the nest, an egg receiving means of a resilient character adapted to receive eggs from the nest, said egg receiving means being operatively associated with the latching means whereby to prevent the entry door from swinging open when an egg is deposited in said egg receiving means and simultaneously render the latching means ineffective with respect to the exit door, and a drawer mounted in the housing beneath the nest and egg receiving means and removable from the housing to receive the eggs from the egg receiving means.

5. A trap nest comprising a housing having an entry opening and an exit opening, a vertically reciprocable door controlling the entry opening and normally disposed in a lowered or open position, a door for the exit opening normally disposed in closed position, latch means normally ineffective with respect to the entry door and effective with respect to the exit door, an oscillatory nest structure within the housing intermediate the doors, operative connecting means between the nest structure and the entry door whereby the door will normally balance the nest and hold the nest in its uppermost position with the door in its lowermost or open position, said nest being adapted to be moved to its lowermost position with the door in its closed or raised position when the weight of a hen is imposed on the nest, said door being capable of swinging movement when in its raised position whereby a hen in the nest may normally swing the door outwardly and exit from the nest, means for preventing the entry door from lowering when swung to a position other than its normal position, an egg receiving means of a resilient character adapted to receive eggs from the nest, said egg receiving means being operatively associated with the latching means whereby to prevent the entry door from swinging open when an egg is deposited in said egg receiving means and simultaneously render the latching means ineffective with respect to the exit door, and a drawer in the housing beneath the egg receiving means and removable from the housing, said drawer having a gently sloping false bottom of reticulated material upon which the eggs may deposit from said egg receiving means, said false bottom sloping from said egg receiving means toward the end of the housing wherein the entry opening is formed.

6. A trap nest comprising a housing having an entry opening at one end thereof and an exit opening at the other end thereof, a vertically reciprocable door for the entry opening normally disposed in a lowered position unobstructing said opening, an outwardly swinging door for said exit opening, latch means normally ineffective relative to the entry door and normally effective relative to the exit door, an oscillatory nest structure in the housing, operative connecting means between the nest structure and the entry door whereby the entry door will be moved to its closed position when the weight of a hen is imposed on the nest and will return to open position when the nest is relieved of the weight of the hen, and an egg receiving means onto which an egg may be delivered from the nest and by which the latch means will be actuated to render the latch means effective relative to the entry door and ineffective relative to the exit door when an egg is deposited upon said egg receiving means.

7. A trap nest comprising a housing having an entry opening at one end thereof and an exit opening at the other end thereof, a vertically reciprocable door for the entry opening normally disposed in a lowered position unobstructing said opening, an outwardly swinging door for said exit opening, latch means normally ineffective with respect to the entry door and effective with respect to the exit door, an oscillatory nest structure within the housing intermediate the doors, operative connecting means between the nest structure and the entry door whereby the door will normally balance the nest and hold the nest in its uppermost position with the door in its lowermost or open position, said nest being adapted to be moved to its lowermost position with the door in its closed or raised position when the weight of a hen is imposed on the nest, said door being capable of swinging movement when in its raised position whereby a hen in the nest may normally swing the door outwardly and exit from the nest, means for preventing the entry door from lowering when swung to a position other than its normal position, an egg receiving means of a resilient character adapted to receive eggs from the nest, said egg receiving means being operatively associated with the latching means whereby to prevent the entry door from swinging open when an egg is deposited in said egg receiving means and simultaneously render the latching means ineffective with respect to the exit door.

8. A trap nest comprising a housing having an entry opening at one end and an exit opening at the opposite end, a vertically swinging nest disposed within the housing intermediate and beneath said openings, a vertically reciprocable door for closing the entry opening, said door being capable of outward swinging movement when in raised position, a pair of levers arranged upon opposite sides of the housing above the nest and pivoted at a point intermediate their ends to the housing, pivotal connections connecting said levers at one end to the top of said vertically reciprocable door, links connecting the opposite ends of said levers with the swinging end of said nest whereby downward swinging movement of the nest will act to raise the door, a vertically swinging door for the exit opening, a longitudinally disposed and centrally pivoted latch lever disposed beneath the nest, an egg receiving scale mounted adjacent one end of said lever and adapted to register with the free end of the nest when the nest is in its lowermost position, latch means at one end of said lever normally latching said exit door from opening, latch means at the opposite end of said lever normally ineffective with respect to the entry door, the weight of said latching lever being disposed relative to its pivotal point whereby the deposit of an egg on said scale will swing the lever about its pivotal point and actuate the latching means to unlatch the exit door and to latch the entry door against outward swinging movement.

9. A trap nest comprising a housing having an entry opening at one end and an exit opening at the opposite end, a vertically reciprocable entry door for closing the entry opening, said door being adapted to be swung outwardly to open the entry opening when in raised position, a vertical swinging exit door for closing the exit opening, a vertical swinging nest arranged substantially horizontally within the housing between the openings and pivoted to the housing at a point exteriorly of the entry opening, a pair of longitudinally disposed arms arranged one at each side of the housing and pivoted to the housing intermediate their ends, pivotal connections between one end of said arms and the top of the entry door, links connecting the other ends of the arms to the free end of the nest whereby downward swinging movement of the free end of the nest will be accompanied by upward movement of the entry door, said entry door being free to swing outwardly when it reaches its uppermost position, means for preventing raising of the nest and lowering of the entry door when the door is swung outwardly, a longitudinally disposed latch lever arranged within the housing beneath the nest and pivoted intermediate its ends to the housing, latch means at opposite ends of said latch lever, the latch means at one end normally latching said exit door closed, the latch means at the other end normally ineffective against outward swinging movement of the entry door when the same is in a raised position, egg receiving means carried by said latch lever and adapted to receive an egg from said nest, said latch lever being balanced about its pivotal point whereby the weight of an egg deposited in said egg receiving means will cause reversal of the latching means to unlatch the exit door and render the latch means effective to prevent outward swinging movement of the entry door.

ALBERT O. FORSTER.
PERCY M. FORSTER.